US009828931B1

(12) United States Patent
Villaire et al.

(10) Patent No.: US 9,828,931 B1
(45) Date of Patent: Nov. 28, 2017

(54) DIESEL LOW PRESSURE/HIGH PRESSURE FLOW CONTROL SYSTEM

(71) Applicant: GM Global Technology Operations LLC, Detroit, MI (US)

(72) Inventors: William L. Villaire, Clarkston, MI (US); Philip A. Yaccarino, Troy, MI (US); Peter Hubl, Clarkston, MI (US); Mitchell E. Hart, Grand Blanc, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/339,985

(22) Filed: Nov. 1, 2016

(51) Int. Cl.
*F02M 31/20* (2006.01)
*F02D 41/38* (2006.01)
*F02M 37/00* (2006.01)
*F02M 55/02* (2006.01)

(52) U.S. Cl.
CPC ...... *F02D 41/3863* (2013.01); *F02D 41/3836* (2013.01); *F02M 31/205* (2013.01); *F02M 37/0047* (2013.01); *F02M 37/0052* (2013.01); *F02M 37/0076* (2013.01); *F02M 55/025* (2013.01); *F02D 2200/0606* (2013.01)

(58) Field of Classification Search
CPC ......... F02D 41/3836; F02D 2200/0606; F02D 2200/0608; F02M 31/20; F02M 31/205; F02M 37/0052
USPC ................... 123/456, 511, 512, 541
See application file for complete search history.

(56) References Cited

U.S. PATENT DOCUMENTS

| 4,411,239 | A | * | 10/1983 | Kelch | F02M 31/20 123/514 |
| 5,207,203 | A | * | 5/1993 | Wagner | F02M 37/0023 123/456 |
| 5,263,456 | A | * | 11/1993 | Owen-Evans | F02D 33/006 123/495 |
| 5,765,537 | A | * | 6/1998 | Coleman | F02M 25/0228 123/514 |
| 6,257,208 | B1 | * | 7/2001 | Harvey | F02M 37/20 123/456 |
| 7,493,893 | B2 | * | 2/2009 | Funabashi | F02D 33/006 123/457 |
| 7,827,971 | B2 | | 11/2010 | Ranganathan et al. | |
| 2009/0250038 | A1 | | 10/2009 | Xu et al. | |

(Continued)

*Primary Examiner* — Erick Solis
(74) *Attorney, Agent, or Firm* — Harness, Dickey & Pierce, P.L.C.

(57) ABSTRACT

A fuel injection apparatus for an internal combustion engine includes a fuel supply line in communication with a fuel tank and a fuel pump system. A fuel rail is connected to the fuel supply system and a plurality of fuel injectors. A return line extending from the fuel rail to the fuel tank. A by-pass passage extending from the supply line to the return line and including a pressure release valve having a pre-set activation pressure. A fuel temperature sensor for sensing a feed temperature of the fuel in the fuel supply system. A pressure control module that sets a first pressure set point in the fuel rail below the pre-set activation pressure when the feed temperature is below a predetermined temperature and sets a second pressure set point above the pre-set activation pressure of the pressure release valve when the feed temperature is above the predetermined temperature.

2 Claims, 1 Drawing Sheet

(56) References Cited

U.S. PATENT DOCUMENTS

2012/0024263 A1     2/2012   Melis et al.
2012/0185152 A1     7/2012   Shibata et al.

\* cited by examiner

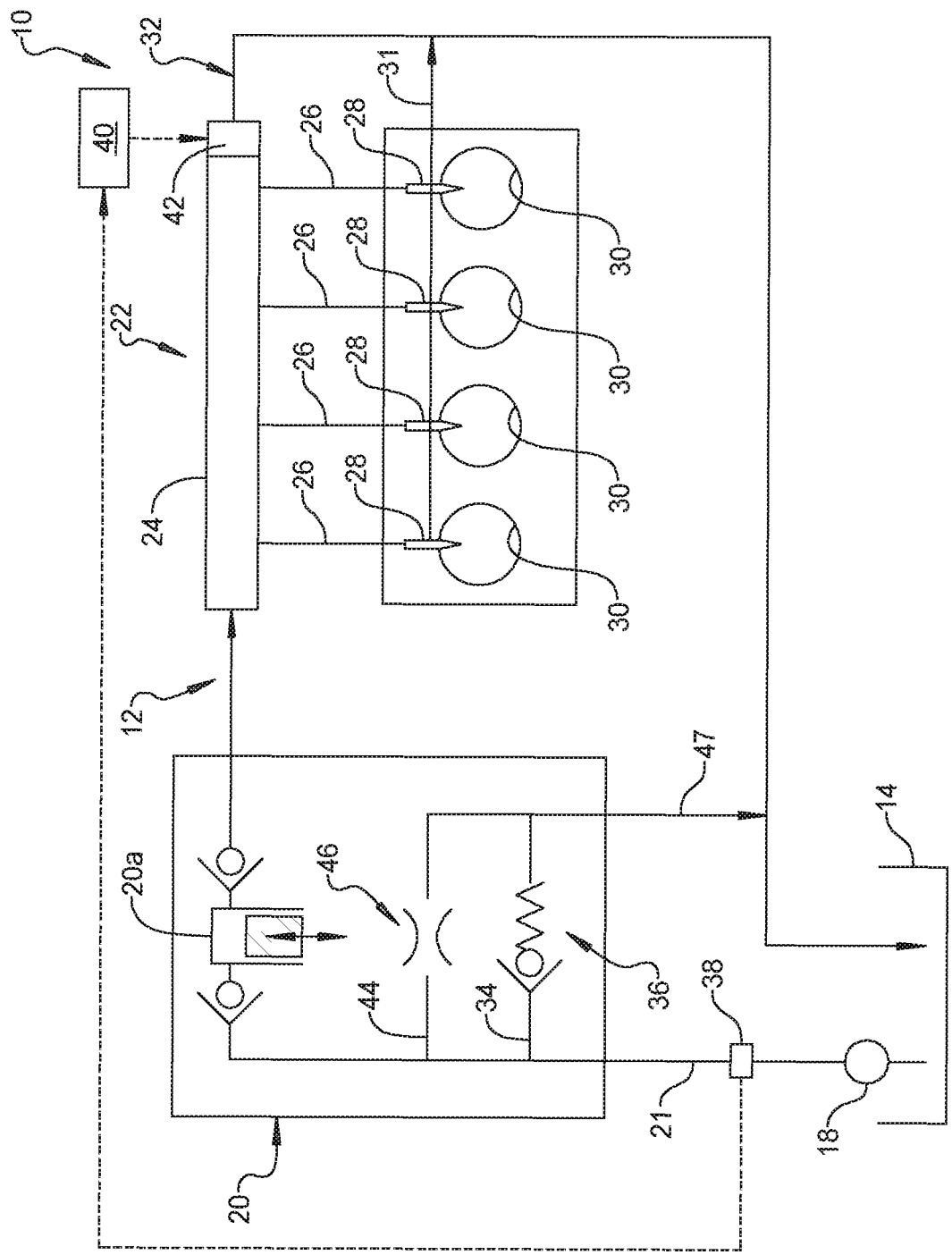

DIESEL LOW PRESSURE/HIGH PRESSURE FLOW CONTROL SYSTEM

FIELD

The present disclosure relates to a system for cooling the return fuel from a diesel fuel system.

BACKGROUND

This section provides background information related to the present disclosure which is not necessarily prior art.

Fuel injection systems configured to supply high-pressure fuel from a fuel pump to a set of fuel injectors are well-known. In such systems, a fuel rail assembly consists of a common rail and the injector feed lines supplying the fuel from the pump to the injectors. Hot diesel fuel returned to the fuel tank can be too hot for the materials typically used. Cooling systems have been provided for cooling the fuel returned to the fuel tank including active air or liquid cooling options that require additional hardware and have many packaging constraints. Accordingly, is desirable to provide a system that can eliminate cooling hardware and increase the durability of the fuel handling components.

SUMMARY

This section provides a general summary of the disclosure, and is not a comprehensive disclosure of its full scope or all of its features.

A fuel injection apparatus for an internal combustion engine having a plurality of combustion chambers. The apparatus including a fuel supply system including a fuel supply line in communication with a fuel tank and a fuel pump for pumping fuel from the fuel tank through the fuel supply line. A fuel injection system connected to the fuel supply system and including a fuel rail and a plurality of fuel injectors operable for injecting the fuel into an associated one of the plurality of combustion chambers. A fuel return line extending from the fuel injection system to the fuel tank. A by-pass passage extending from the fuel supply line to the fuel return line and including a pressure regulator valve having a pre-set activation pressure. A fuel temperature sensor for sensing a feed temperature of the fuel in the fuel supply system. A fuel pressure control module for controlling the pressure of the fuel in the fuel supply system, wherein the fuel pressure control module sets a first pressure set point below the pre-set activation pressure of the pressure release valve when the feed temperature is below a predetermined temperature and sets a second pressure set point above the pre-set activation pressure of the pressure release valve when the feed temperature is above a predetermined temperature.

The system of the present disclosure results in mass reduction by limitation of cooling hardware for the return fuel line. In addition, by mixing the fuel from the fuel tank to cool the return line fuel, the durability of the fuel handling components is increased. In addition, the system of the present disclosure is less complex with your joints and connections on the return line side. The present disclosure also allows for flexibility in packaging and performance and allows for common solution for diesel cooling applications. In addition, the flexible fuel delivery control strategy officer better performance and better energy optimization of the low pressure flow control system.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

The FIGURE is a schematic illustration of a fuel injection system for an internal combustion engine.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

With reference now to the FIGURE, an internal combustion engine 10 is shown including a fuel injection assembly 12. The fuel injection assembly 12 includes a fuel tank 14 and a fuel supply system 16 in communication with the fuel tank 14. The fuel supply system 16 can include a low-pressure feed pump 18 fluidly coupled to the fuel tank 14 which can pump fuel to a high-pressure injector pump 20 by a fuel supply line 21. The high-pressure injector pump 20 supplies the fuel to a fuel injection system 22 which includes one or more fuel rails 24. The fuel injection system 22 further includes a plurality of injector lines 26 extending from the fuel rails 24 and fluidly coupled with a plurality of fuel injectors 28 for directly injecting fuel into an associated combustion chamber 30 of the internal combustion engine 10.

A fuel return line 32 extends from the fuel injection system 22 to the fuel tank 14. In particular, the fuel return line 32 can extend from the fuel rail 24 to the fuel tank 14. An injector return fuel line is connected between the fuel injectors 28 and the fuel return line 32. The high pressure injector pump 20 can be provided with a pump mechanism 20a and a bypass passage 34 which extends from the fuel supply line 21 to the fuel return line 32 via passage 47 and includes a pressure release valve 36 having a pre-set activation pressure $P_a$. By way of non-limiting example, the pre-set activation pressure $P_a$ of the pressure release valve 36 can be set at 500 kPa.

A fuel temperature sensor 38 is provided for sensing a feed temperature $T_f$ of the fuel in the fuel supply system 16. In particular, the fuel temperature sensor 38 can be provided in the fuel supply line 21. A fuel pressure control module 40 is provided for controlling the pressure of the fuel in the fuel supply system 16 based upon the feed temperature $T_f$ of the fuel in the fuel supply system 16. In particular, when the feed temperature $T_f$ of the fuel in the fuel supply system 16 is below a pre-set feed temperature $T_s$ (for example 55° C.), the fuel pressure control module 40 sets a first pressure set point $P_{s1}$ below the pre-set activation pressure $P_a$ of the pressure release valve 36. When the feed temperature $T_f$ of the fuel in the fuel supply system 16 is above the pre-set feed temperature $T_s$, the fuel pressure control module 40 sets a second pressure set point $P_{s2}$ above the pre-set activation pressure $P_a$ of the pressure release valve 36. The set point pressures $P_{s1}$, $P_{s2}$ can be controlled by control of a pressure regulating valve 42 between the fuel rail 24 and the fuel return line 32, by active monitoring of the fuel rail pressure and controlling operation of the high pressure pump, or by other known pressure control techniques. The high pressure injector pump 20 can further include a restricted flow cooling passage 44 including an orifice 46 that can communicate between the fuel supply line 21 and the fuel return line 32 via the passage 47.

By way of non-limiting example, the first pressure set point $P_{s1}$ can be 410 kPa and the second pressure set point $P_{s2}$ can be 600 kPa. The effect of raising the second pressure set point $P_{s2}$ above the pre-set activation pressure $P_a$ (example 500 kPa) of the pressure regulator valve 36 is to cause fuel from the fuel tank 14 to mix with the fuel in the return line 32 to cool the fuel that is returning to the fuel tank 14. In other words, the present disclosure uses a multi-point control strategy to increase the bypass flow through bypass line 34 to initiate cooling of the return fuel when the engine is under high loads. This can be accomplished by coupling the control of the diesel high and low pressure flow systems where the high pressure system transitions to a higher low-pressure delivery set point based on fuel feed temperature $T_f$. Although the system of the present disclosure is being described with respect to using the fuel feed temperature $T_f$, other control parameters such as engine speed or other parameters indicative of a high engine load can also be utilized. The raising of the pressure set point when the feed temperature is elevated impacts the cooling by opening the pressure release valve 36 in the by-pass passage 34 allowing more cool fuel flow into the return line 32 and effectively lowering the temperature of the fuel in the return line 32 before it reaches the fuel tank 14. When the feed temperature of the fuel in the supply line drops below a second pre-set temperature such as 50° C. the control module 40 resets the pressure set point to the first pressure set point $P_{s1}$ which will result in less fuel being returned to the fuel return line 32 for cooling purposes.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A fuel injection apparatus for an internal combustion engine having a plurality of combustion chambers, the apparatus comprising:
   a fuel tank;
   a fuel supply system including a fuel supply line in communication with the fuel tank and a fuel pump for pumping fuel from the fuel tank through the fuel supply line;
   a fuel injection system connected to the fuel supply system and including a fuel rail and a plurality of fuel injectors operable for injecting the fuel into an associated one of the plurality of combustion chambers;
   a fuel return line extending from the fuel injection system to the fuel tank;
   a by-pass passage extending from the fuel supply line to the fuel return line and including a pressure release valve having a pre-set activation pressure;
   a fuel temperature sensor for sensing a feed temperature of the fuel in the fuel supply system;
   a fuel pressure control module for controlling the pressure of the fuel in the fuel supply system, wherein the fuel pressure control module sets a first pressure set point below the pre-set activation pressure of the pressure release valve when the feed temperature is below a predetermined temperature and sets a second pressure set point above the pre-set activation pressure of the pressure release valve when the feed temperature is above the predetermined temperature.

2. The fuel injection apparatus according to claim 1, further comprising a pressure regulator valve disposed in communication with the fuel rail and the fuel return line and being controllable between the first and second pressure set points.

* * * * *